United States Patent
Arnold et al.

(10) Patent No.: US 10,552,453 B2
(45) Date of Patent: Feb. 4, 2020

(54) DETERMINING DATA REPLICATION COST FOR CLOUD BASED APPLICATION

(71) Applicant: INTERNATIONAL BUSINESS MACHINES CORPORATION, Armonk, NY (US)

(72) Inventors: Jason K. Arnold, Chicago, IL (US); Henry E. Calzaretta, Lisle, IL (US); Shantan Kethireddy, Chicago, IL (US); Dylan S. Murphy, Newton, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1023 days.

(21) Appl. No.: 14/951,974

(22) Filed: Nov. 25, 2015

(65) Prior Publication Data

US 2017/0147672 A1    May 25, 2017

(51) Int. Cl.
*G06F 7/00*       (2006.01)
*G06F 16/27*      (2019.01)
*H04L 29/08*      (2006.01)

(52) U.S. Cl.
CPC ............ *G06F 16/275* (2019.01); *G06F 16/27* (2019.01); *H04L 67/10* (2013.01); *H04L 67/1023* (2013.01)

(58) Field of Classification Search
CPC ...................................................... G06F 16/27
See application file for complete search history.

(56) References Cited

U.S. PATENT DOCUMENTS

| 7,386,715 | B2 | 7/2008 | Lawrence et al. |
| 8,312,125 | B1* | 11/2012 | Rioux ................. H04L 61/3025 709/203 |
| 2012/0278578 | A1 | 11/2012 | Castillo et al. |
| 2014/0207736 | A1 | 7/2014 | Susanto et al. |
| 2015/0112933 | A1* | 4/2015 | Satapathy ........... H04L 41/5019 707/634 |

OTHER PUBLICATIONS

Arnold et al., "Determining Data Replication Cost for Cloud Based Application," U.S. Appl. No. 16/681,758, filed Nov. 12, 2019.
List of IBM Patents or Patent Applications Treated As Related; Date Filed: Nov. 12, 2019, 2 pages.

* cited by examiner

*Primary Examiner* — Ajith Jacob
(74) *Attorney, Agent, or Firm* — Cantor Colburn LLP; Alexander Jochym

(57) ABSTRACT

Technical solutions are described for determining data replication cost for a data server. In an example, a method for estimating the data replication cost includes receiving an identification of a source table and an identification of a target table for the data replication. The method further includes receiving a selection of a data replication scheme to be used to replicate the data. A costing system that implements the method determines the data replication cost, based on a conversion cost for conversion of the data from the source table to the target table, and a transfer cost for transfer of the data from the source table to the target table. The costing system communicates the data replication cost to an administrator.

19 Claims, 7 Drawing Sheets

DETERMINING DATA REPLICATION COST FOR CLOUD BASED APPLICATION

BACKGROUND

The present application relates to server technology, and more specifically, to determining how to replicate data in a server.

In a cloud-computing environment, replication of data as against using another technique to provide data to an end-user has different cost implications. For example, a database administrator (DBA) or any other personnel in a cloud computing environment provider may be tasked to decide an optimal data replication strategy that could be used for a query offload.

SUMMARY

According to an embodiment, a computer implemented method for determining a data replication cost for a data server includes receiving, by a costing system, an identification of a source table and an identification of a target table in the data server, where data from the source table is to be replicated into the target table. The computer implemented method also includes receiving a selection of a data replication scheme to be used to replicate the data. The computer implemented method also includes determining the data replication cost to replicate the data from the source table to the target table using the data replication scheme, based on a conversion cost for conversion of the data from the source table to the target table, and a transfer cost for transfer of the data from the source table to the target table. The computer implemented method also includes communicating the data replication cost to a user, such as a database administrator.

According to another embodiment, a system for determining a data replication cost for a data server includes a costing repository stores metadata associated with tables in the data server. The system also includes a costing system. The costing system receives an identification of a source table and an identification of a target table, where the source table and the target table are in the data server, and data from the source table is to be replicated into the target table. The costing system also receives a selection of a data replication scheme to be used to replicate the data, where the data replication scheme identifies a frequency of replication of the data from the source table to the target table. The costing system also identifies characteristics of the source table and the target table based on the metadata in the costing repository. The costing system also determines the data replication cost to replicate the data from the source table to the target table using the data replication scheme, based on a conversion cost for conversion of the data from the source table to the target table, and a transfer cost for transfer of the data from the source table to the target table. The costing system also communicates the data replication cost to a user, such as a database administrator.

According to another embodiment a computer program product for determining a data replication cost for a data server includes computer readable storage medium. The computer readable storage medium includes computer executable instructions to receive an identification of a source table and an identification of a target table, where the source table and the target table are in the data server, and data from the source table is to be replicated into the target table. The computer readable storage medium also includes computer executable instructions to receive a selection of a data replication scheme to be used to replicate the data, where the data replication scheme identifies a frequency of replication of the data from the source table to the target table. The computer readable storage medium also includes computer executable instructions to determine the data replication cost to replicate the data from the source table to the target table using the data replication scheme, based on a conversion cost for conversion of the data from the source table to the target table, and a transfer cost for transfer of the data from the source table to the target table. The computer readable storage medium also includes computer executable instructions to communicate the data replication cost to a user, such as a database administrator.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
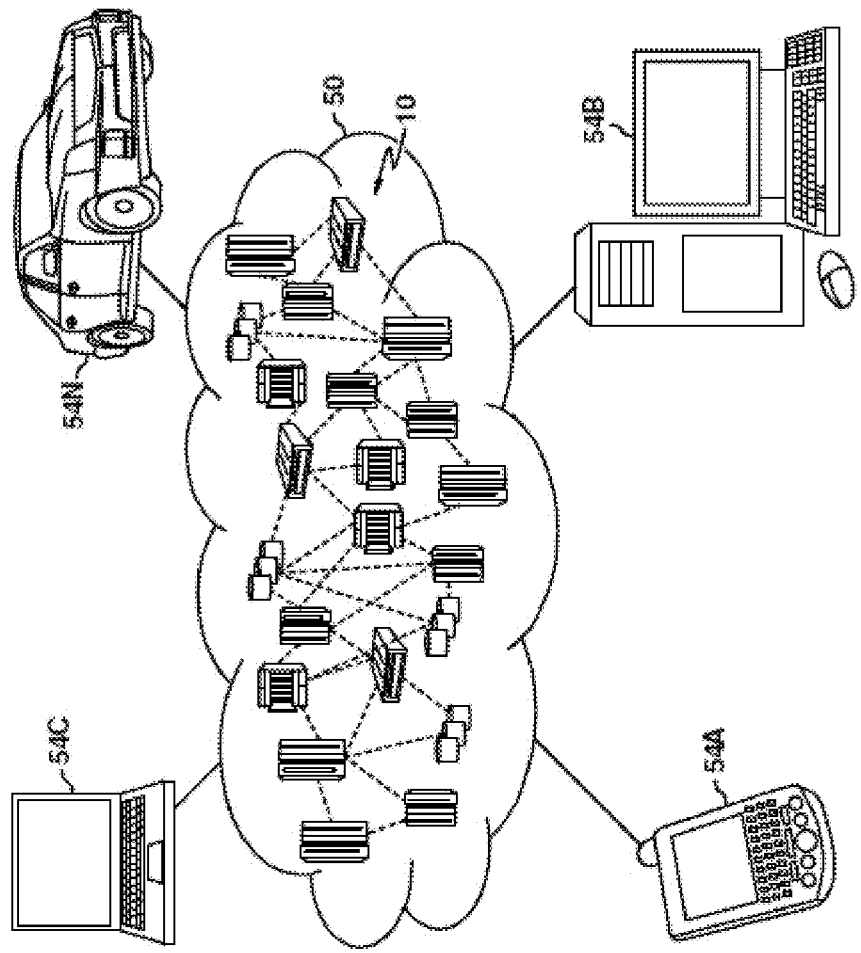
FIG. 1 depicts a cloud computing environment according to an embodiment of the present invention.

Disclosed here are technical solutions for determining costs of data replication in a cloud-computing environment. Further, the technical solutions facilitate comparing costs of data replication and costs associated with other load strategies. By understanding the cost of various replication strategies can facilitate a business, providing cloud-computing services to its end-users, such as a bank providing a web-based account management portal to its customers, to establish different levels of service level agreements and cost tiers for particular services and/or particular customers. Further yet, by understanding costs of a multitude of replication options can facilitate forecasting when capacity limits will be reached, understanding true cost of a new workload, understanding how a replication option affects vendor (such as independent software vendor (ISV)) costs, among others.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
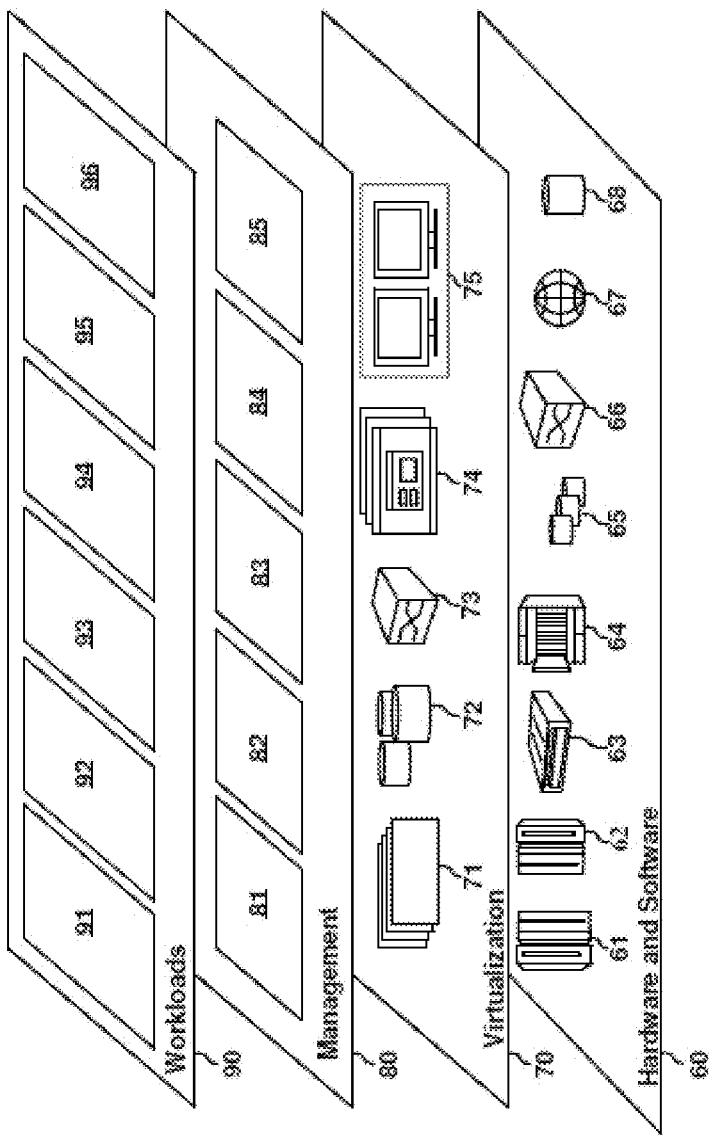
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing and analysis of customer feedback of applications 96.

Figure 3:
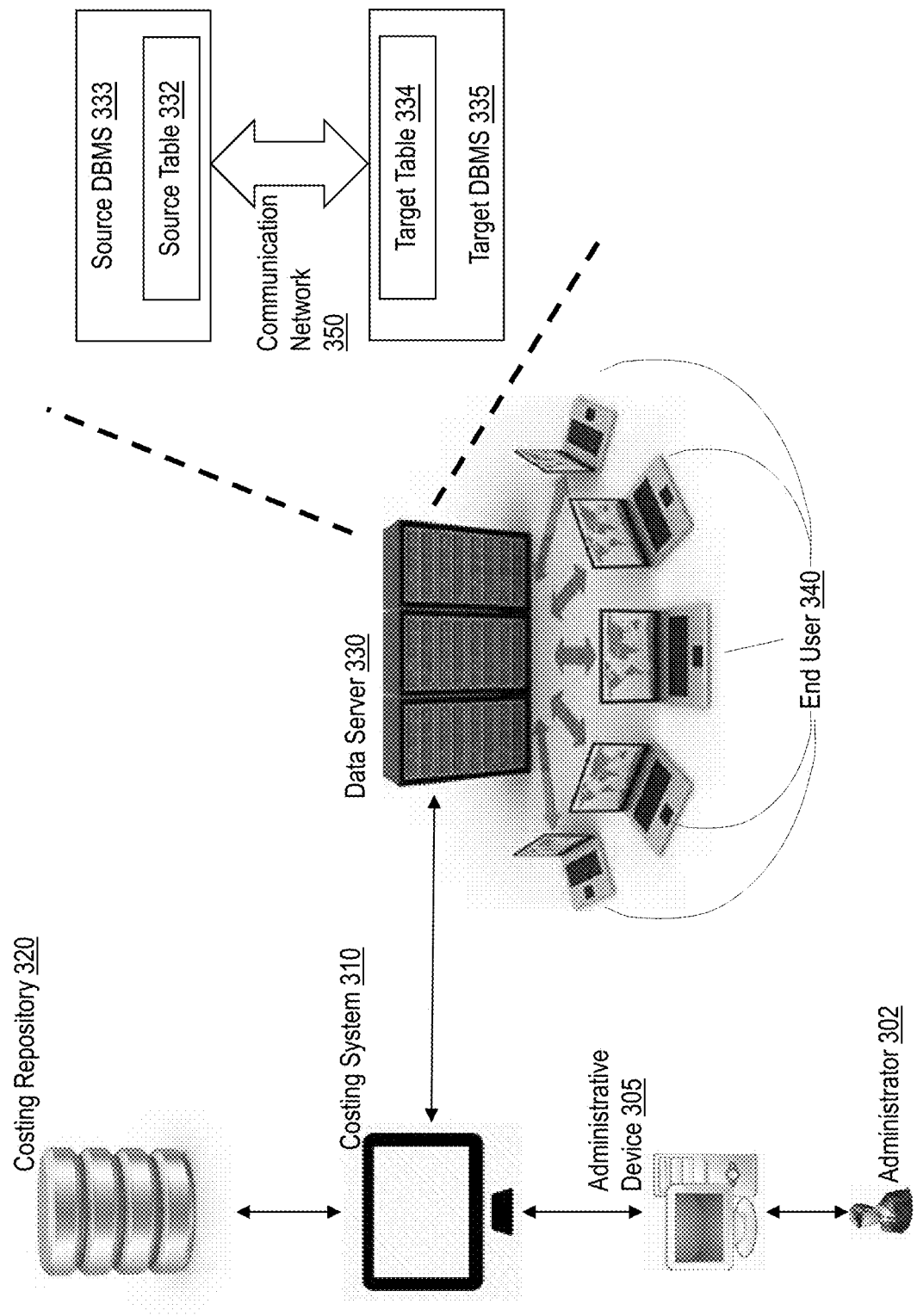
FIG. 3 illustrates an example system for determining data replication cost in accordance with an embodiment.

FIG. 3 illustrates an example scenario in which a costing system 310 determines costs for data replication for a data server 330 that may be accessed by an end user 340 from among several end users. The costing system 310 uses a costing repository 320 to determine the costs. The costing system 310 determines the cost in response to a request from an administrative device 305. In an example, an DBA 302, such as a DBA responsible to manage the data server 330 sends the request to the costing system 310 via the administrative device 305. In an example, the costing system 310 is executed by the administrative device 305.

The data server 330, in an example, stores transactional data such as banking data, insurance data, e-commerce data, online purchases, marketing data, blogging data, video data, image data, or any other data that the end user 340 accesses. The end user 340 may interact with the data in the data server 330, which changes the data in the data server 330. The end user 340 may change a subset of the data in the data server 330, such as a part of the data that the end user 340 is authorized to access. For example, the end user 340 may be a bank customer authorized to access only the data that is associated with the end user's 340 account. In another example, the end user 340 may purchase a product via the data server 330. Alternatively or in addition, as part of the interaction, the end user 340 may query the data in the data server 330. The data server 330, in an example, offloads part of the data that corresponds to the query from the end user 340 prior to providing a response to the end user 340. Alternatively or in addition, the data server 330, in response to a change made by the end user 340 may temporarily store the changed data prior to integrating the changes with the data in the data server 330.

For example, the data server 330 uses data replication to distribute information stored in the data server 330. For example, data replication periodically moves data from a production transaction processing database to a data warehouse. Additionally, data replication is useful as a way to replicate entire databases or off-load information. For example, when the performance of high-volume transaction processing system is critical, such as in case of the data server is an online transaction processing (OLTP) system, it can be advantageous to maintain a duplicate database to isolate the demanding queries of decision support applications. In yet another example of data replication, a read-only table snapshot is created as a local copy of table data that originates from one or more remote master tables. An application can query the data in the read-only table snapshot, but cannot insert, update, or delete rows in the snapshot.

For example, the data server 330 may be a data warehouse that includes one or more databases. The databases may be relational databases, operational databases, distributed databases, or any other type of databases or a combination thereof. The databases further may include one or more tables that contain the data stored by the data server 330. The DBA 302, via the administrative device 305, configures a behavior of the data server 330. For example, the administrative device 305 configures the data server 330 to use data replication. For example, the data server 330 off-loads data to a source table 332, which the data server 330 periodically replicates into a target table 334. The source table 332 may be a temporary table that holds data that the data server 330 uses to process a query from the end user 340. Any changes by the end user 340 to the data are stored in the source table 332, and later, the data server 330 replicates the data from the source table 332 into the target table 334 (for example as part of a commit operation.). Of course, other examples of data replication are possible, as will be obvious to a person skilled in the art.

In an example, the source table 332 is stored in a database management system (DBMS) 333 of a first type, such as DB2™, MICROSOFT SQL SERVER™, ORACLE™, MYSQL™, MICROSOFT ACCESS™, or any other DBMS. The target table 334 may be stored in the same DBMS as the source table 332. Alternatively, the target table 334 is stored in a DBMS 335 different from the source table 332. The target table 334 may be stored in a second type of DBMS, distinct from the first type of the source table 332. (As illustrated). Alternatively, the target table 334 may be stored in a separate DBMS 335 of the same type as the first DBMS 333. In an example, the DBMS 333 and the DBMS 335 are connected via a communication network 350, such as a computer network. For example, the communication network uses Ethernet or any other such communication standards. For example, the data replication from the source table 332 to the target table 334 includes transfer of communication packets from the DBMS 333 to the DBMS 335. The communication packets may use a communication protocol, such as transmission communication protocol/internet protocol (TCP/IP), user datagram protocol (UDP), or any other communication protocol. The communication protocol may limit a size of a payload carried by a single communication packet of the communication network 350. Accordingly, a number of communication packets communicated from the DBMS 333 to the DBMS 335 to replicate the data form the source table 332 to the target table is based on the amount of data to be transferred from the source table 332 to the target table 334. The amount of data to be transferred depends on a selection of a data replication scheme.

The administrative device 305 selects a data replication scheme to be used. The data replication scheme, among other things, indicates a frequency at which the data server 330 replicates the data from the source table 332 into the target table 334. In an example, the data replication scheme is real-time replication. In the real-time replication scheme, the data server 330 reflects every change in the source table 332 into the target table 334 immediately. Accordingly, the source table 332 is kept in synch with the target table 334. In another example, the data server 330 uses a bulk load data replication scheme. In bulk load, the data server 330 replicates the entire data from the source table 332, irrespective of which records in the source table 332 are changed, into the target table 334. The data server 330 may replicate the data periodically after a predetermined duration. The bulk load data replication may also be referred to as a complete refresh. In yet another data replication scheme, referred to as a fast refresh, the data server 330 periodically replicates only changed records from the source table 332 into the target table 334. Thus, the data server 330 keeps track of the records from the source table 332 that have changed since the previous replication, and only replicates the changed records. Alternatively, the data server 330, prior to each replication, identifies the changed records, and replicates only the changed records from the source table 332 into the target table 334.

The costing system 310 determines a data replication cost associated with replicating the data from the source table 332 to the target table 334, based on several factors including the selected data replication scheme. Replicating the data from the source table 332 to the target table 334 is associated with costs at multiple levels based on the configuration selected as part of the data replication scheme. For example, the data replication scheme may be configure a number of parameters. For example, one of the parameters affecting the data replication cost includes data target attributes such as, if the corresponding DBMS' are in a massively parallel processing (MPP) environment, or if any of two tables is a materialized query table (MQT), or if any of the two tables is a local cached table. Other parameters that affect the data replication cost include a velocity of changes to the source table data, a complexity of the changed record(s), such as number of columns, data types used in the records. Yet another parameter affecting the data replication cost is the type of updates being performed, such as a single row update, a block of rows update, or any other updating technique. Another parameter of the data replication scheme that may affect the data replication cost is a type of load, for example, replication, or flash copy, or unload utility. Of course, there may be other parameters of the data replication scheme that affect the data replication cost as will be obvious to a person skilled in the art.

Alternatively or in addition, the data replication cost includes a cost to convert the data from a format of the source table 332 to a format supported by the target table 334. For example, data types used in the two tables may be different, and accordingly, the conversion cost may include a per data type conversion cost. For example, a double byte type field conversion to a single byte type, a code-page conversion. Further, the conversion may include a conversion to be compliant with the communication network 350. For example, the during the data replication, the data server 330 may convert a data type from the source table 332 to a temporary data type for communication to the target table. The data server 330 may convert the temporary data type to a data type supported by the target table 334, when the communication packet is received. Thus, the conversion includes conversions at the sending and receiving end, respectively, which may be in addition to the conversion of the data types. In an example, the costing system 310 may use an external tool for the conversions.

Alternatively or in addition, the data replication cost includes a cost for transferring the data from the source table 332 to the target table 334 across the communication network 350. As described herein, the data server 330 transfers the data across the communication network 350 in form of communication packets that have a maximum payload size. Based on the data replication option, such as entire replication or changed record replication, the costing system 310 identifies the amount of data to transfer as part of the data replication. The costing system 310 then computes a number of communication packets to transfer the amount of data. The costing system 310 determines a cost of transferring a communication packet across the communication network 350. For example, the cost of transferring the communication packet may include a cost of converting the data to network format, such as generating TCP/IP communication packets with a payload that includes a part of the data to transfer, a header describing the communication packet attributes, and a checksum for validation of the payload.

The transfer costs may further be based on characteristics of the communication network 350. For example, the communication network 350 may be a wide open network with the DBMS being more powerful on the target than on the source to avoid any back pressure. For example, if the server of the target table 334 is slower than a performance condition in the SLA, proactively estimating factors such as wait time and buffering may be difficult, and hence the costing system 310 may negotiate reactively using the technical solutions described herein. In another example, the server of the target table 334 may not be gating performance of the system 100, for example by being configured to operate more efficiently than the server at the source table 332 does. The transfer cost may further depend on a transaction size, an average row size, a number of columns, a change type (I/U/D), and whether the transport messages, such as middleware messages like IBM MQ™ messages are persistent or not. In addition to above costs that may be encountered when preparing to send the communication packet, the transfer cost may include costs encountered during and on receipt of the communication packet. For example, decoding and reverse conversion of the data in the communication packet is based on factors such as the transaction size, the average row size, the number of columns, the change type (I/U/D), and whether the transport messages are persistent or not. In another example, the costing system 310 monitors processor operations for using a communication protocol, such as TCP/IP, when communicating the data over the communication network 350. For example, the costing system 310 monitors the processor operations for creating a communication network packet according to the communication protocol being used. The costing system 310, in an example, charges the processor operations to the application that triggers the communication. Alternatively or in addition, the costing system 310 may facilitate the application to query the estimated communication network cost, and further any TCP/IP time was used that was not charged back.

Figure 4:
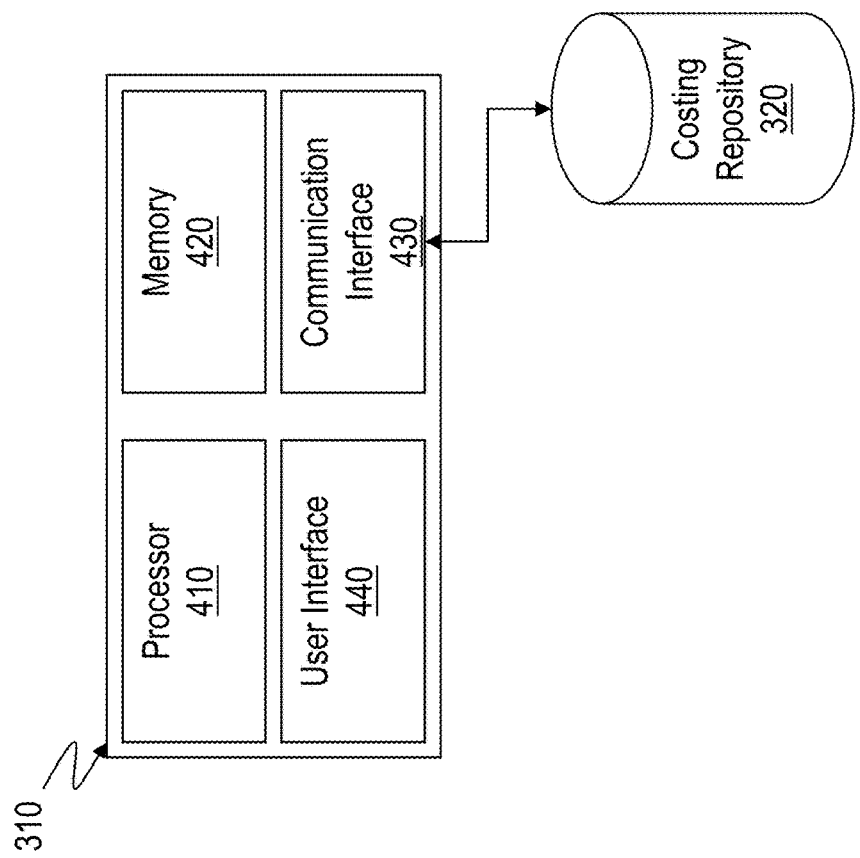
FIG. 4 illustrates a costing system in accordance with an embodiment.

FIG. 4 illustrates components of an example costing system 310 that determines the cost for a data replication. The costing system 310 includes, among other components, hardware such as a processor 410, a memory 420, a communication interface 430, and user interface 440. The components of the costing system 310 may communicate with costing repository 320. In an example, the costing repository 320 may be separate, such as a remote server, from the costing system 310. Alternatively, the costing repository 320 may be part of the costing system 310, such as stored in the memory 420.

The processor 410 may be a central processor of the costing system 310, and is responsible for execution of an operating system, control instructions, and applications installed on the costing system 310. The processor 410 may be one or more devices operable to execute logic. The logic may include computer executable instructions or computer code embodied in the memory 420 or in other memory that when executed by the processor 410, cause the processor 410 to perform the features implemented by the logic. The computer code may include instructions executable with the processor 410. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 410 may be a general processor, central processing unit, server, application specific integrated circuit (ASIC), digital signal processor, field programmable gate array (FPGA), digital circuit, analog circuit, or combinations thereof. The processor 410 may be in communication with the memory 420, the communication interface 430, the user interface 440, and other components of the costing system 310.

The memory 420 is non-transitory computer storage medium. The memory 420 may be DRAM, SRAM, Flash, or any other type of memory or a combination thereof. The memory 420 stores control instructions and applications executable by the processor 410. The memory 420 may contain other data such as images, videos, documents, spreadsheets, audio files, and other data that may be associated with operation of the system 100.

The communication interface 430 facilitates the costing system 310 to receive and transmit data. For example, the communication interface 430 receives instructions and inputs such as selection of the data replication scheme and configuration of the data replication scheme, such as from the administrative device 305. Alternatively or in addition, the communication interface 430 facilitates accessing data from the costing repository 320, or any other data repository. The communication interface 430 may further facilitate identification of attributes of the tables or other types of data structures used by the data server 330. The computer network communication may be wired or wireless. Alternatively or in addition, the communication interface 430 facilitates communication in other manners, such as via communication ports like Universal Serial Bus™ (USB), Ethernet, Thunderbolt™, or any other communication ports. The communication interface 430 further facilitates the costing system 310 to transmit data, such as to store data into the costing repository 320 or any other data repository.

The user interface 440 may include input/output peripherals such as keyboard, mouse, touchscreen, microphone, display, speakers, and any other components that facilitate user interaction with the system 100. In an example, a user inputs configuration values, instructions, or other data during the operation and to aid determination of the cost by the costing system 310. In addition, the costing system 310 includes components such as computational devices like graphics processing unit (GPU), arithmetic unit (AU), or any other co-processor (not shown). The user interface 440 may display and/or communicate the cost determined by the costing system 310. In an example, the cost may be communicated for display or attention of the DBA 302 via the administrative device 305. In another example, the costing system 310 compares one or more data replication schemes and provides a recommendation to the DBA 302 based on the costs associated with each of the data replication schemes compared.

The costing repository 320 contains information that the costing system 310 uses to determine the data replication cost. In an example, the costing repository 320 contains costs for the different parameters involved in the data replication. For example, the costing repository 320 may store a number of processing cycles to complete a data conversion. In addition, the costing repository 320 may store maximum payload size for different types of communication packets that may be used for data replication. In an example, the costing repository aggregates application level latency requirements for the underlying data tables. For example, the DBA 302 may input the latency requirements via the user interface 440 of the costing system 310 or the application may specify the latency requirements using the source table 332 and/or the target table 334. Thus, the DBA 302 and/or the application identifies a maximum limit of the latency that can be tolerated. Accordingly, the DBA 302, instead of comparing 2 or more load options, may determine the cost of a specific load option, such as to determine a return on investment, generate marketing documents, generating a report, or any other reason.

The costing repository 320, alternatively or in addition, stores attributes of the tables in the data server, such as the data types being used, the number of rows, the number of columns, and other such attributes. For example, the metadata of the source table 332 and/or target table 334 is accessed in response to the DBA 302 specifying the tables for replication/load. The metadata may be accessed through a programming interface, such as a Java database connectivity (JDBC) connection or the like. In an example, the costing system 310 polls the metadata in real time to monitor any changes in the metadata. Further yet, the costing repository 320 stores a log of costs associated with earlier data replications between the source table 332 and the target table 334. The costing system 310, based on the log, determines the cost of the data replication over a duration of time. In other examples, the costing system 310 determines the cost based on additional or alternative data, such as DBA 302 feedback. For example, the log contains data replication costs associated with the last one hundred data replications between the source table 332 and the target table 334 that were performed over that last one month. The costing system 310 aggregates the data replication costs for the entire one month to determine a total cost of the data replication over the span of one month. In another example, the costing system 310 uses the log to determine data replication cost per week. In other example, data replication cost for any other duration can be determined.

Figure 5:
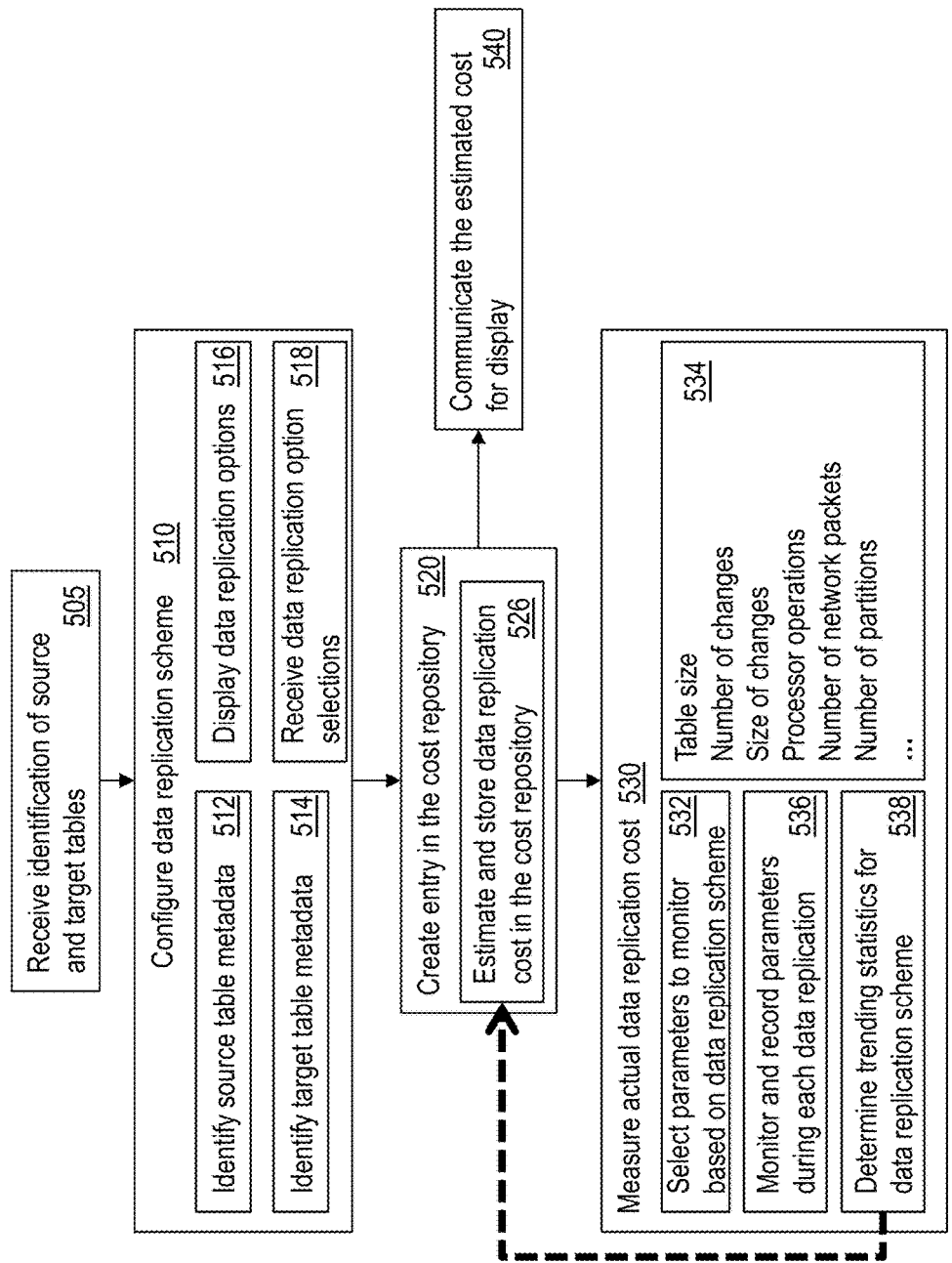
FIG. 5 illustrates a flowchart for determining data replication cost in accordance with an embodiment.

FIG. 5 illustrates a flowchart of determining the data replication cost. The costing system 310 implements the flowchart. In an example, the operations illustrated are performed in an order different than what is illustrated. The costing system 310 determines the data replication cost based on a number of different factors including data volume, row size, data types, hardware, volume of changes, and types of transactions on the source table 332. The costing system 310, via the communication interface 430, receives an identification of the source table 332 and an identification of the target table 334, as shown at block 505. For example the identifications may be sent by the administrative device 305. In an example, the DBA 302 initiates the identification process via the user interface 440. The user interface 440 displays a list of tables on the data server 330. The DBA 302 selects the two tables that are to be used as the source table 332 and the target table 334 respectively.

The costing system 310, via the communication interface 430, further configures the data replication scheme to use, as shown at block 510. For example, the administrative device 305 selects options of the data replication scheme to use, as shown at block 518. In an example, the user interface 440 displays a list of options that the DBA 302 selects from, as shown at block 516. For example, the list of options is based on the capabilities of the data server 330. For example, the costing system 310 identifies the metadata of the source table 332 and the target table 334, as shown at blocks 512 and 514. For example, consider that the data server 330 uses IBM DB2 Analytics Accelerator™ (IDAA) for offloading the source table 332. For example, the data server 330 implements a data replication using a real-time replication scheme or a bulk replication scheme. In the real-time replication scheme, the data server 330 triggers a data replication for every change, or more frequently than the bulk replication scheme. For example, in the bulk replication scheme, the data server 330 triggers the data replication once every day, such as at 3 AM in the morning, or any other frequency and time. The real-time replication scheme may trigger data replication once every hour, or any other such frequency. The costing system 310 identifies that the IDAA support, and accordingly identifies and displays as options for the data replication a full table reload, a reload by partition, a group consistent load, a group consistent load from flashcopy, and an incremental update. The costing system 310 identifies the capabilities of the device server from records in the costing repository 320. In an example, the costing repository 320 contains a database that identifies capabilities of one or more tools, hardware, modules, and/or other components that the data server 330 uses for the data replication.

The costing system 310 creates an entry for the data replication in the costing repository to record the log of the costs associated with the data replication, as shown at block 520. In an example, the costing system estimates a cost for the data replication based on data that is stored in the costing repository already and the options for the data replication scheme that the DBA 302 selects, as shown at block 526. For example, if the DBA 302 selects a full table reload for the data replication the costing system 310 estimates the costs from the a catalog of the DBMS 333 of the source table 332, such as a DB2™ catalog. In an example, the DBA 302 may select specific columns within the table for the reload. Alternatively, if the DBA 302 selects the reload by partition data replication, the costing system 310 identifies, from the DBMS catalog, which partitions contain data that is to be replicated into the target table 334 and the size in bytes of the partitions identified. In case the DBA 302 selects the group consistent load data replication, the costing system 310 estimates how much log data to examine when a group consistent load is performed, in addition to identifying the partitions to replicate. Along with estimating a number of records that change over time, the velocity of changes in the log is determined based on the log data, for example in reload schemes using incremental update, or group consistent load. In an example, the costing system 310 scans the log data to identify characteristics of the data over a predetermined range of time. For example, the predetermined range may be a week, two weeks, a month, or any other range. The costing system 310 scans the log data for a predetermined number of time ranges, for example five weeks, to identify a number of changes in each week. Of course, other time ranges may be used in other examples. The costing system 310, accordingly, determines a number of changes, and further a velocity of changes, related to the target table 334 and specifically to the columns identified in the replication scheme. The log data may contain information from previous execution of data reloads.

The costing system 310 estimates the cost based on a combination of a size in bytes of the partitions to be replicated and the amount of log data to examine. In another case, if the DBA 302 selects the group consistent load from flashcopy, the data server 330 uses the storage subsystem to perform the replication. However, the data must still be read and sent over the communication network 350 to the appliance. In this case, the cost is proportional to the size of the data in bytes, which is estimated via the DBMS catalog. In another case, if the DBA 302 selects an incremental update the costing system 310 estimates an incremental update cost, by scanning a DBMS log to see how many changes have occurred on the objects over a given time period. The costing system 310 in an example additionally uses sizes of the respective changes during the estimation. The costing system 310 uses the number of changes and the sizes of the changes as input to the estimation process. Thus, the costing system 310 estimates a cost for the selected data replication scheme for the data server 330 and records the estimate in the costing repository along with the options selected for the data replication scheme. In an example, the DBA 302 selects a different data replication scheme based on the data replication cost estimates that the costing system 310 provides for the different data replication scheme options.

The costing system 310 monitors the data replication to measure actual costs associated with operations included in the data replication, as shown at block 530. The costing system 310 determines which operations, and accordingly, which costs to monitor based on the data replication scheme options selected, as shown at block 532. For example, to monitor the costs the costing system 310 monitors parameters such as source table size, number of changes in the source table 332 to reflect into the target table 334, size of changes, number of processor operations for the data replication, number of network packets for the data replication, and number of partitions to replicate, among other factors, as shown at block 534. The costing system 310 monitors and records the identified values of such parameters in the costing repository 320 for each data replication performed by the data server 330, as shown at block 536. In an example, the costing system 310 determines trend statistics, such as average, variation, standard deviation, among others, for the selected data replication scheme based on the recorded parameter values, as shown at block 538. The statistics are used for estimation of the data replication costs for a next iteration, as illustrated. The costing system 310 communicates the estimate to the DBA 302, such as via the administrative device 305, as shown at block 540.

In an example, the costing system 310 estimates the cost based on attributes, including a frequency of changes to source data, complexity of changed record(s), type of updates being performed (for example, reorg/bulk load vs single row update/real-time update) and a type of load (e.g. replication vs flash copy vs unload utility). For example, the costing system uses record size, transaction size, data type impacts, dynamic bandwidth sampling, to determine and estimate the data replication cost.

For example, consider a data replication scenario in which a subset of columns and rows in source table A are replicated to a target table B. The cost of the data replication, in this case, is measured in terms of CPU seconds per second of elapsed time. In an example, the CPU seconds may be associated with a monetary cost or any other costing unit to charge to a client that causes the data replication data. Consider that in the example scenario the source and target databases are of the same type, configuration, and version, and further that the source and target hardware are the same type, configuration, and version. Further, consider that source and target replication tasks are the same version with the same priorities and allocated resources with the source and target operating systems being the same type, version, and maintenance level. These considerations are exemplary and in other examples, the source and target tables may have several differences that may cause additional data conversions than those described. Further, the replication flow from the source to the target in the example, may include the source application transactions being committed and the transactions being logged in the database. The data replication may including updating log with both, before and after images of the row being changed. The source task may filter out unmapped columns and rows that do not meet filtering criteria. The data replication may further include constructing a replication message and sending the replication message from the source table to the target table across the communication network. The target table deconstructs the replication message and applies changes to the destination table, such as using system query language (SQL) statements. Of course, other examples may use a different replication flow than the one described in the example.

In the example, for explaining the computation of the data replication costs, consider that an average row length is 100 Bytes, an average row length of mapped columns is 80 Bytes, and that 75% of rows meet a row filtering condition, from a total of ten million of rows. Further, assume that a primary key column in this case includes 10 Bytes of data. The details of the mapping to be performed between the source table and the target table may be identified, in addition to any transformations, filtering, and any other replication options. For example, the mapping may include a string concatenation to convert two source columns into one, and conversion of lower case to upper case in one column. Other examples, may include additional or alternative mapping.

The costing system 310, based on the history or testing within a location, documents costs for actions applicable to data movement. The costing system 310 uses these values to estimate the cost for the data replication flow. For example, a cost to log 100 Bytes in database is 0.5 CPU Seconds. A cost to prepare 100 Bytes of user data in a replication message is 0.1 CPU Seconds. A cost to deconstruct 100 Bytes of user data in a replication message is 0.1 CPU Seconds. A cost to transform data (string concatenation, case transformation and so on) per 10 Bytes is 0.1 CPU Seconds. A cost to run replication on source per 100 Bytes replicated is 0.1 CPU Seconds. A cost to run replication on target per 100 Bytes replicated is 0.1 CPU Seconds. A network cost to move 100 Bytes of data is 0.1 CPU Seconds. The CPU Seconds which is indicative of processing the data is spread across multiple processors. The costs may be different in different scenarios. For example, in case, the data transformation included additional steps, such as translation from one language to another (English to French), the estimated cost may be higher than what is described here. In an example, the data transformation costs may be documented according to categories of data transformation, such as simple, medium, and complex, which represent an increasing complexity of the data transformation. Each category may include a predetermined set of transformations, for example categorized by the DBA.

The costing system 310 further identifies a workload, which is a collection of the operations that are included in each iteration of the data replication. For example, the costing system 310 determines that on average each second, ten new records are inserted, hundred records updated, and eight records are deleted. Further, the costing system 310 identifies that on average each second, 10 MB of data is logged on the source and 10 MB of data is logged on the target. The costing system 310 further notes that 75% of transactions affect rows that are identified for replication.

The costing system 310, based on the documented costs and the workload, determines a source cost. In an example, for inserts and deletes, the replication does not include additional logging in the database. Therefore, in an example, the cost of logging may be added in an example, that is the costing system 310 accounts for additional logging cost for updates since it adds to the volume logged.

For example, in the above example, for 10 new records inserted (without accounting for logging), the costing system 310 determines that the amount of data for the source cost is 10*100 Bytes=1 MB. Thus, the replicated data=1 MB*0.8*0.75=600 Bytes, since 80% of data in rows is mapped/replicated and 75% of transactions affect unfiltered rows. Further, since inserts, deletes, and updates are separate individual transactions, the costing system 310 determines that a cost to prepare the replication message=600/100*0.1 CPU Seconds=0.6 CPU Seconds. Therefore, a cost for replication transformation=1000/100*0.1 CPU Seconds=1 CPU Seconds. Further, cost for replication task on source=600/100*0.1 CPU Seconds=0.6 CPU Seconds. Thus, a total cost per Second=2.2 CPU Seconds.

Assuming that the replication a full image of the row being changed, before and after the changes, the costing system 310 determines the cost for the 100 updated records by accounting for the logging. Thus, the amount of data replicated includes 100*100 Bytes=10 MB. Thus, replicated data=10 MB*0.8*0.75=6 MB; The cost to prepare replication message=6000/100*0.1 CPU Seconds=6 CPU Seconds; the cost for replication transformation=10000/100*0.1 CPU Seconds=10 CPU Seconds; the cost for replication task on source=6000/100*0.1 CPU Seconds=6 CPU Seconds. Since, additional data logged=5 MB, a cost of additional logging=(5000/100)*0.5 CPU Seconds=25 CPU Seconds. Thus, the total cost per second=47 CPU Seconds, accounting for the logging.

Further, in case 8 records are deleted, the costing system 310 determines that without account for logging, the amount of data to handle is 8*10 Bytes=80 Bytes. Thus, the replicated data=80 Bytes*0.75=60 Bytes. Accordingly, the cost to prepare replication message=60/100*0.1 CPU Seconds=0.06 CPU Seconds; the cost for replication transformation=80/100*0.1 CPU Seconds=0.08 CPU Seconds; the cost for replication task on source=60/100*0.1 CPU Seconds=0.06 CPU Seconds. Thus, the total cost per Second=0.22 CPU Seconds, for the deleted records.

Thus, the sum total of the above three calculated cost, which is the total source cost=2.2+47+0.22=49.42 CPU Seconds.

Further, in this example, the costing system determines the network cost as 6660/100*0.1=6.66 CPU seconds.

The costing system 310 additionally calculates a target cost, that is the cost on the target side for the 10 new records, 100 updated records, and the 8 deleted records. For example, for the inserted records, replicated data=600 Bytes. Therefore, a cost to deconstruct replication message=600/100*0.1 CPU Seconds=0.6 CPU Seconds; a cost for replication task on target=600/100*0.1 CPU Seconds=0.6 CPU Seconds. Accordingly, total cost per Second for the new records=1.2 CPU Seconds.

In case of the updated records, the replicated Data=6 MB. Therefore, the cost to deconstruct replication message=6000/100*0.1 CPU Seconds=6 CPU Seconds; the cost for replication task on target=6000/100*0.1 CPU Seconds=6 CPU Seconds. Thus, the total cost per Second for the updated records=12 CPU Seconds.

In addition, for the deleted records, the replicated data=60 Bytes. Accordingly, the cost to deconstruct replication message=60/100*0.1 CPU Seconds=0.06 CPU Seconds; and the cost for replication task on target=60/100*0.1 CPU Seconds=0.06 CPU Seconds. Thus, the total cost per Second for the deleted records=0.12 CPU Seconds.

Thus, the total target cost, which is a sum of the above three costs is Total Cost=6.72 CPU Seconds.

The costing system 310 further determines the total data replication cost as Total Data Replication Cost=Source Cost+Network Cost+Target Cost=49.42+6.66+6.72=62.8 CPU Seconds for each second of elapsed time.

Thus, in the above example, the costing system 310 identifies the total data replication cost in terms of the processor operations and the network communication costs, which includes operations for data conversion and transfer. Each type of operation may be assigned a monetary value or any other cost value, which facilitates expressing a cost for the data replication in monetary terms, or any other unit. Of course, as will be obvious to a person skilled in the art, the cost values used in the above described scenario are exemplary and other examples may have different values. In addition, the source, network, and target costs may be computed using additional, alternative, or fewer components than those described above.

For example, in case the full table load option is selected, the costing system determines a size of the table at different times the data replication is performed. The costing system 310 uses the size of the table and the time taken for the data replication to determine an average or trend information, and to predict the size of the table at future points in time. The costing system 310 uses this information for providing an estimate the next time the DBA 302 requests an estimate for the data replication scheme. Additionally, the costing system 310 monitors a number of processor operations performed for data conversion, as well as the network transfer of the data when the full table reloads are actually performed. Thus, the costing system 310 monitors the data replication, such as the time, number of processor operations, a number of network packets, among other factors to determine an actual cost for the full table reload data replication scheme. In an example, the costing system 310 determines an average cost of the full table reload data replication scheme over a predetermined duration of time, or over a predetermined number of data replications. In an example, the DBA 302 provides information about characteristics of the communication network 350, for example, a speed of the network, a maximum bandwidth, a maximum packet size, whether the communication network 350 is private or public, and if public, the average concurrent bandwidth being transmitted across the communication network 350. In addition or alternatively, the costing system 310 monitors the communication network 350 over a predetermined duration to determine the characteristics of the communication network 350, such as the average network transmission speed.

In the case where the administrative device 305 selects the reload by partition option, the costing system scans the DBMS log and identifies a number of partitions that change during the a refresh period, or through real time statistics of the system. In addition, the costing system identifies characteristics of the changed partition, such as a size of the partition, data types causing a data conversion and other such characteristics. In addition, the costing system 310 determines the table size. The costing system 310 monitors the data replication, such as the time, number of processor operations, a number of network packets, among other factors to determine an actual cost for the reload by partition data replication scheme. In an example, the costing system 310 determines an average cost of the reload by partition data replication scheme over a predetermined duration of time, or over a predetermined number of data replications. In an example, bulk replication may include partition or full table replication.

In the case, the data replication uses a group consistent load scheme, in addition to monitoring the factors delineated in the earlier examples, the costing system 310 monitors an amount of log data read. For example, for each data replication performed, the costing system 310 tracks and records the amount of log data that is read to identify changes to reflect into the target table 334. The costing system 310, in an example, further monitors the time and processor operations for the log reading. In an example, bulk replication includes the group consistent load scheme. The costing system 310 in this case determines, for each table, how many records are changed. Based on the per table changes, the costing system 310 determines the velocity of changes to all the tables in the group. For example, the costing system 310 estimates the velocity by determining an average number of changes over time by scanning log data. The costing system 310 determines how many changes occur to each table in the group for each data replication. The costing system 310 determines a cost for the data replication for predetermined time duration, such as day, a week or any other time duration by computing a product of the cost for each data replication load and a number of times per day the data replication is performed.

In the case, the group consistent load from flash copy is selected, the costing system 310 monitors and records actual cost based on number of processor operations, a number of network packets, and time, which depend on table size. In the case, the DBA 302 selects an incremental update, the costing system 310 periodically scans the DBMS log to determine a number of changes and sizes of each change that are to be reflected into the target table 334. In an example, the costing system 310 monitors and stores the parameters separately on both the source table 332 side and the target table 334 side.

Figure 6:
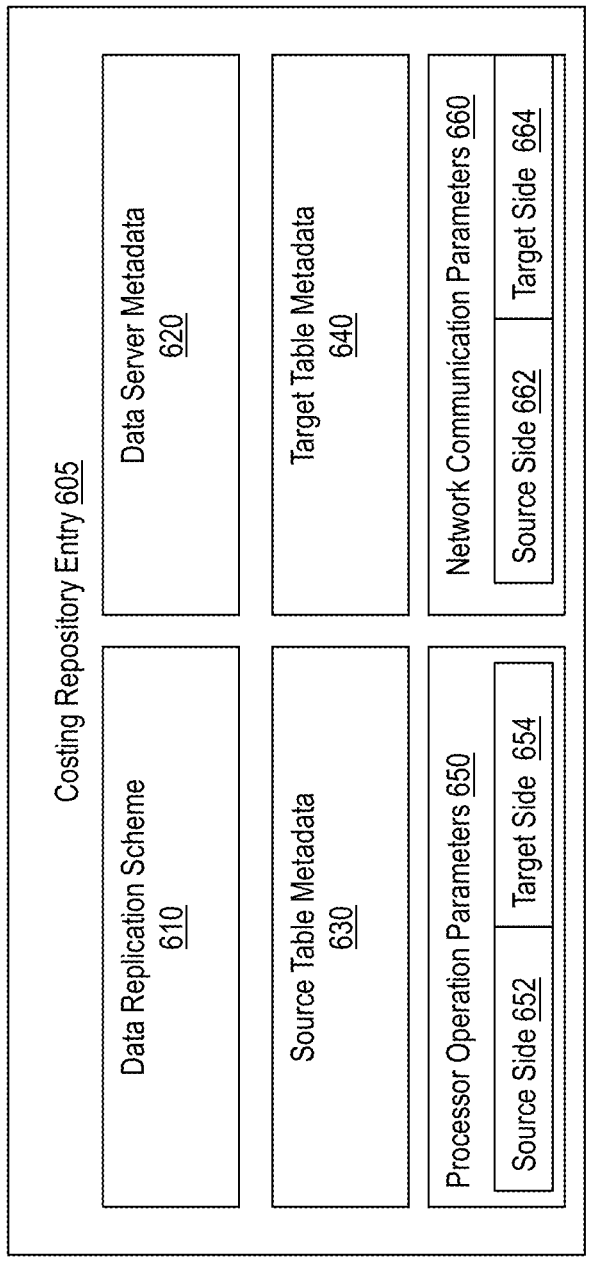
FIG. 6 illustrates an example entry in an example costing repository in accordance with an embodiment.

FIG. 6 illustrates an example entry 605 in the costing repository 320. The costing system 310 maintains records the data replication scheme 610 associated with the costing entry 605. For example, the options that the DBA 302 selected, such as the frequency of replication, the type of replication, and other such options are recorded in the entry 605. Additionally, the costing system 310 may store metadata of the data server 620, such as type of hardware, type of software, version numbers, and other such metadata of the data server. The costing system 310 further records source table metadata 630 and target table metadata 640. For example, the costing system 310 may maintain the table sizes, number of columns, number of rows, data types used, and other such metadata with respect to each the source table 332 and the target table 334.

The costing system 310 further records a number of processor operations 650 to complete a data replication. For example, the processor operations to access the data from the source table 332 convert the data from source data type to the target data type, store the data at the target table 334, and other such operations. In an example, the costing system maintains separate records of the operations on the source side 652 and the target side 654. The costing system 310, in addition, records costs associated with the communication network 350. For example, the costing system 310 tracks and stores the network communication parameters 660, such as the number of packets, the communication protocol used, and the costs associated with the transfer of the network packets. For example, the costing system 310 records processor operations associated with encoding and decoding the network packets at the source and the target side. In an example, the costing system 310 maintains separate source side 662 and target side 664 records in the costing entry for the network costs. The costing system 310 may facilitate the DBA 302 to use the administrative device 305 to compare the performance of the source and the target system based on the separate records in the costing repository entry 605.

The costing system 310 monitors the costs for each data replication performed according to the data replication scheme selected and updates the costing entry 605 accordingly. In an example, the costing system 310 maintains records for a predetermined number of data replications in the entry 605. For example, the costing system 310 maintains costs for the past 50 data replications, or past 100 data replications, or any other such number of data replications from the source table 332 and the target table 334. Alternatively or in addition, the costing system 310 maintains records for a predetermined time duration, irrespective of a number of data replications during that time duration. For example, the costing system 310 maintains costs for the data replications for the past 1 day, or past 1 week, or past 1 month, or any other such predetermined time duration to be monitored. The DBA 302 may configure the predetermined number of data replications or the predetermined time duration to monitor.

The costing system 310 polls a log of the source table 332 to determine the velocity of changes to the source table over time. For example, the costing system 310 accesses one or more different snapshot timeframes in the log (for example, different one-hour, or one-day, or any other timeframe snapshots) and identifies an amount of the data identified for replication that changed over time. In an example, the timeframes accessed include high velocity change periods like end of month/beginning of month. If this is a first time the data replication is being performed, the DBA 302 may provide estimates of a number of changed rows over a period of time and, an amount of the row data that has changed over time (for example, a percentage).

The costing system 310 maintains separate entries for different data replications. For example, for another pair of source table and target table, other than the source table 332 and target table 334, the costing system 310 maintains a separate entry in the costing repository.

In an example, the costing system 310 uses data from across multiple pairs of source table and target table to estimate the data replication cost. Alternatively, the costing system 310 uses only the data associated with the source table 332 and the target table 334 to estimate the cost for the data replication scheme between the two tables.

Figure 7:
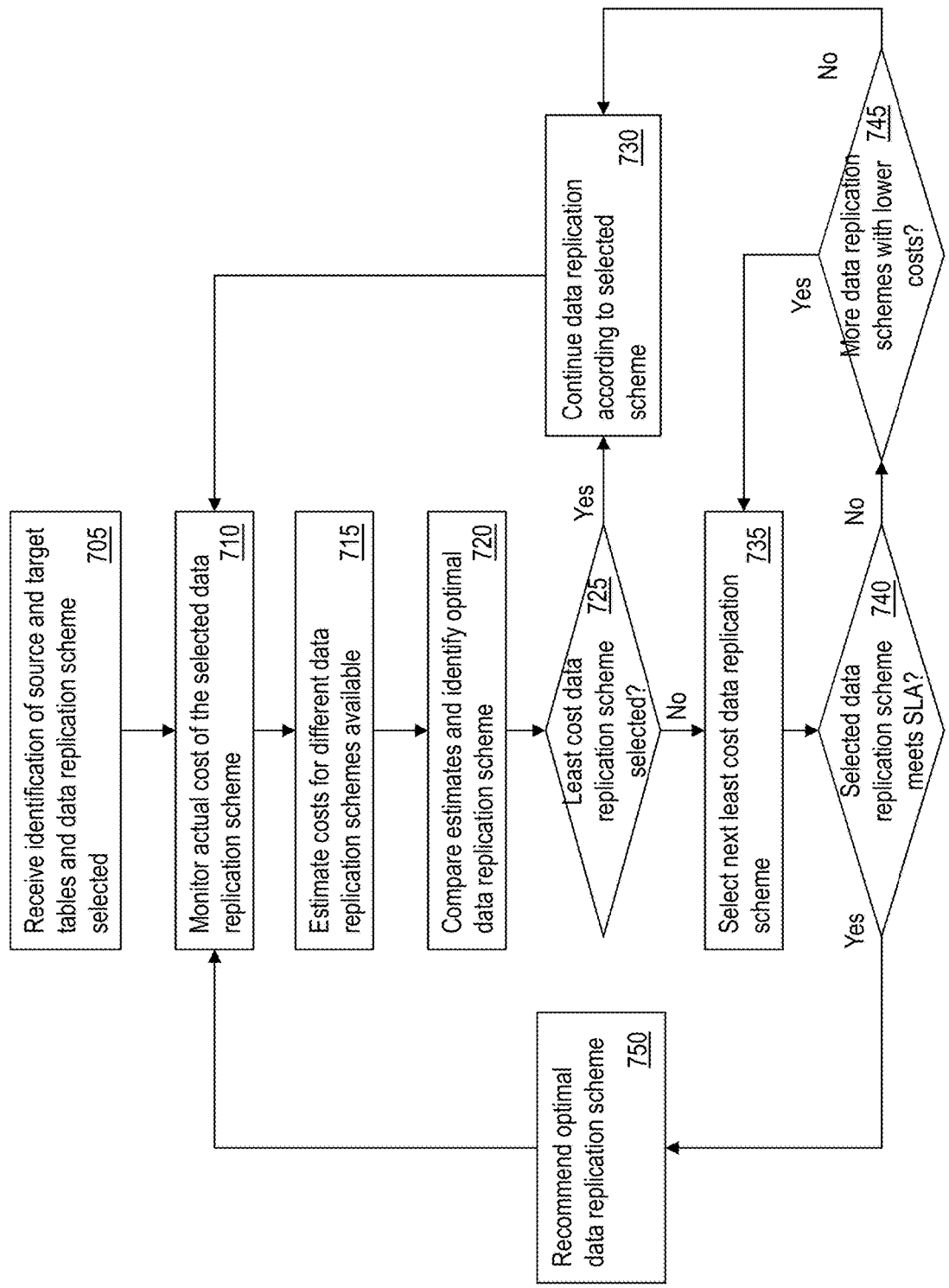
FIG. 7 illustrates an example flowchart for determining an optimal data replication scheme in accordance with an embodiment.

FIG. 7 illustrates a flowchart for identifying an optimal data replication scheme for a data server and a pair of source and target tables. The operations illustrated may be performed in an order other than that illustrated. In an example, the costing system 310 implements the process illustrated by the flowchart. The costing system 310 receives identification of source and target tables and a current data replication scheme selected, as shown at block 705. For example, the DBA 302 uses the administrative device 305 to identify the tables and the data replication scheme being used. The costing system 310 determines the metadata of the source and target tables, as well as the database systems included in the data server 330 that implements the data replication. The costing system 310 monitors the data replication, as shown at block 710. The costing system 310 monitors a predetermined number of iterations of the data replication. Alternatively, the costing system monitors iterations of the data replications over a predetermined duration of time, such as a week, a month and so on.

The costing system 310 estimates costs associated with alternative data replication schemes available, as shown at block 715. For example, the current data replication scheme may be the full table reload. The costing system 310 may estimate the cost for other data replication schemes available, such as the reload by partition, incremental update, or any other scheme. In an example, the costing system 310, based on the metadata of the data server 330 and the source and target tables, may identify the data replication schemes that are implementable. Further, the costing system 310 compares the estimate costs of the other data replication schemes with the current data replication scheme, as shown at block 720. If the current data replication scheme is optimal, for example has lowest cost, the costing system continues with the current data replication scheme, as shown at blocks 725 and 730. Alternatively, if the current data replication scheme is costlier than an estimated data replication scheme, the costing system 310 selects a next alternative data replication scheme with the least cost, as shown at block 735. The costing system 310 determines if the selected next alternative data replication with the least cost meets data replication conditions specified by a service level agreements (SLA), as shown at block 740. If the SLA conditions are not met, and if additional alternative data replication costs have been identified that have a cost lower than the current data replication scheme being used, the costing system 310 selects a next data replication scheme, as shown at blocks 740 and 745. Alternatively, if the next data replication scheme with the lower cost also meets the SLA conditions, the costing system 310 recommends the alternative data replication scheme with the least cost to the DBA 302, as shown at block 750. For example, the costing system 310 communicates the optimal data replication scheme to the administrative device 305 for display. In either case, the costing system 310 may continue to monitor the costs of the data replication and suggesting alternative data replication schemes, as illustrated.

For example, consider that the current data replication scheme being used is the full table reload every 3 hours. As the size of the table increases, the costing system 310 may identify that using the reload by partition data replication may reduce the data replication cost as a partition may be replicated instead of the entire table. The costing system 310 may ensure that the partition data replication meets the SLA conditions, and if that is the case, recommend the partition data replication to the DBA 302. The costing system 310 may continue to monitor the data replication. In another example, the DBA 302 may query the costing system 310 to estimate cost for using an incremental update for the data replication at a higher frequency, such as every 10 minutes instead of the full table reload every 3 hours, over a span of week. In an example, the costing system 310 may estimate that the cost of the incremental update is more than the full table reload over the one week span. Of course, in other examples, the cost may be estimated over different time spans, such as a month, a day, a year, or any other such time span.

The costing system technical solutions described herein, thus facilitate a user, such as a DBA to understands costs associated with data integration method between a source and a target system. Based on the costs, the costing system may identify and suggest alternative optimized loading strategies based not only on the application latency requirements, but also on the cost of the load strategies. For example, typically cloud-based applications define their latency requirements, such as in a service level agreement (SLA). Typically, costing system uses the SLA requirements to determine use of accelerator/cached objects for data replication. The costing system described herein improve identification of optimized load strategies by further determining costs of maintaining such data replication objects instead of maintaining a transactional database, such as the source table for offloading. The costing system described herein, thus may identify cost savings over accessing transactional database systems.

In an example, consider a DBA of a financial institution, such as a bank, that maintains a data server that uses a source table to temporarily store data, such as a transactional database, that is later reflected into the target table, such as a master database. The data sever may use a database system such as DB2™ z/OS™ transactional systems, solidDB™ transactional systems, and DB2™ z/OS™ reporting systems. The data server moves data from the DB2 z/OS transactional systems to the solidDB transactional systems for applications that have strict response time service level agreement(s) (SLAs). The data server may additionally or alternatively move data from the DB2 z/OS transactional systems to the DB2 z/OS reporting systems, so as not to impact transactional SLAs. The data server may also include an IDAA™, which is used to improve response time for transactional and reporting applications. The DBA is responsible to determine a strategy for meeting application SLAs, while minimizing cost. Accordingly, the DBA may use the costing system described herein to analyze a current data replication scheme and further to identify an alternative and optimized data replication scheme based on this analysis. Additionally, the costing system identifies costs that may be charged to a client based on the data transfer, such as application chargeback, by incorporating the cost of moving data. Thus, the costing system facilitates the DBA to do a true cost to own (TCO) analysis of the data server.

The technical solutions described herein facilitate an administrative device, and in turn an administrator to determine cloud data replication costs based on attributes, including a frequency of changes to source data, complexity of changed record(s), type of updates being performed (for example, reorg/bulk load vs single row update/real-time update) and a type of load (e.g. replication vs flash copy vs unload utility). Accordingly, the technical solutions provide cost for a data replication scheme that take into account an application latency condition per an SLA and, additionally a cost to perform the data replication based on source and target environments, and communication network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for determining a data replication cost for a data server, the method comprising:
   receiving, by a processor of a costing system, an identification of a source table and an identification of a target table in the data server, wherein data from the source table is to be replicated into the target table;
   receiving, by the processor, a selection of a data replication scheme to be used to replicate the data;
   determining, by the processor, the data replication cost to replicate the data from the source table to the target table using the data replication scheme, based on a conversion cost for conversion of the data from the source table to the target table, and a transfer cost for transfer of the data from the source table to the target table, wherein the conversion cost is based on a number of processor operations to convert the data from the source database to the target database; and
   communicating, by the processor, the data replication cost.

2. The computer implemented method of claim 1 further comprising:
   determining, by the processor, an amount of data to be replicated from the source table to the target table based on the data replication scheme.

3. The computer implemented method of claim 2 further comprising:
   identifying, by the processor, a type of a source database of the source table;
   identifying, by the processor, a type of a target database of the target table; and
   determining, by the processor, the conversion cost to convert the data from the type of the source database to the type of the target database.

4. The computer implemented method of claim 2 further comprising:
   identifying, by the processor, a maximum payload size of communication packets that transfer data from the source table to the target table;
   determining, by the processor, a number of communication packets to transfer the amount of data from the source table to the target table based on the maximum payload size; and
   determining, by the processor, the transfer cost to transfer the data from the source table to the target table based on a cost for transfer of a single communication packet and the number of communication packets to transfer the amount of data.

5. The computer implemented method of claim 1, wherein the data replication scheme identifies a frequency of replication of the data from the source table to the target table.

6. The computer implemented method of claim 5, wherein the data replication scheme is one of real-time replication, or bulk replication.

7. The computer implemented method of claim 1, wherein the data replication cost is determined for a predetermined duration that spans one or more data replications from the source table to the target table.

8. The computer implemented method of claim 1, wherein the data replication scheme is a first data replication scheme, the data replication cost is a first data replication cost, and the method further comprises:
   receiving a selection of a second data replication scheme;
   determining a second data replication cost to replicate the data from the source table to the target table using the second data replication scheme; and
   communicating the first data replication cost and the second data replication cost.

9. A system for determining a data replication cost for a data server, the system comprising:
   a costing repository configured to store metadata associated with tables in the data server; and
   a costing system comprising a processor coupled with the costing repository, the processor is configured to:
   receive an identification of a source table and an identification of a target table, wherein the source table and the target table are in the data server, and data from the source table is to be replicated into the target table;

receive a selection of a data replication scheme to be used to replicate the data, wherein the data replication scheme identifies a frequency of replication of the data from the source table to the target table;

identify characteristics of the source table and the target table based on the metadata in the costing repository;

determine the data replication cost to replicate the data from the source table to the target table using the data replication scheme, based on a conversion cost for conversion of the data from the source table to the target table, and a transfer cost for transfer of the data from the source table to the target table; and communicate the data replication cost.

10. The system of claim 9, wherein the processor is further configured to determine an amount of data to be replicated from the source table to the target table based on the data replication scheme.

11. The system of claim 10, wherein the processor is further configured to:
identify a type of a source database of the source table;
identify a type of a target database of the target table; and
determine the conversion cost to convert the data from the type of the source database to the type of the target database based on a number of processor operations to convert the amount of data from the type of the source database to the type of the target database.

12. The system of claim 10, wherein the processor is further configured to:
identify a maximum payload size of communication packets that transfer data from the source table to the target table;
determine a number of communication packets to transfer the amount of data from the source table to the target table based on the maximum payload size; and
determine the transfer cost to transfer the data from the source table to the target table based on a cost for transfer of a single communication packet and the number of communication packets to transfer the amount of data.

13. The system of claim 9, wherein the data replication scheme is one of real-time replication and bulk replication.

14. The system of claim 9, wherein the data replication cost is determined for a predetermined duration that spans one or more data replications from the source table to the target table.

15. The system of claim 9, wherein the data replication scheme is a first data replication scheme, the data replication cost is a first data replication cost, and the processor is further configured to:
receive a selection of a second data replication scheme;
determine a second data replication cost to replicate the data from the source table to the target table using the second data replication scheme; and
communicate the first data replication cost and the second data replication cost.

16. A computer program product determining a data replication cost for a data server, the computer product comprising computer readable storage medium, the computer readable storage medium comprising computer executable instructions, wherein the computer readable storage medium comprises instructions to:
receive an identification of a source table and an identification of a target table, wherein the source table and the target table are in the data server, and data from the source table is to be replicated into the target table;
receive a selection of a data replication scheme to be used to replicate the data, wherein the data replication scheme identifies a frequency of replication of the data from the source table to the target table;
determine the data replication cost to replicate the data from the source table to the target table using the data replication scheme, based on a conversion cost for conversion of the data from the source table to the target table, and a transfer cost for transfer of the data from the source table to the target table; and
communicate the data replication cost.

17. The computer program product of claim 16, wherein the computer readable storage medium further comprises instructions to:
determine an amount of data to be replicated from the source table to the target table based on the data replication scheme;
identify a type of a source database of the source table;
identify a type of a target database of the target table; and
determine the conversion cost to convert the data from the type of the source database to the type of the target database based on a number of processor operations to convert the amount of data from the type of the source database to the type of the target database.

18. The computer program product of claim 16, wherein the computer readable storage medium further comprises instructions to:
determine an amount of data to be replicated from the source table to the target table based on the data replication scheme;
identify a maximum payload size of communication packets that transfer data from the source table to the target table;
determine a number of communication packets to transfer the amount of data from the source table to the target table based on the maximum payload size; and
determine the transfer cost to transfer the data from the source table to the target table based on a cost for transfer of a single communication packet and the number of communication packets to transfer the amount of data.

19. The computer program product of claim 16, wherein the data replication cost is determined for a predetermined duration that spans one or more data replications from the source table to the target table.

* * * * *